United States Patent
Hélot et al.

(10) Patent No.: US 10,726,812 B2
(45) Date of Patent: Jul. 28, 2020

(54) METHOD FOR CONTROLLING A DISPLAY APPARATUS FOR A MOTOR VEHICLE, AND MOTOR VEHICLE HAVING A DISPLAY APPARATUS

(71) Applicant: AUDI AG, Ingolstadt (DE)

(72) Inventors: Jacques Hélot, Ingolstadt (DE); Joris Mertens, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/328,520

(22) PCT Filed: Aug. 3, 2017

(86) PCT No.: PCT/EP2017/069624
§ 371 (c)(1),
(2) Date: Feb. 26, 2019

(87) PCT Pub. No.: WO2018/041511
PCT Pub. Date: Mar. 8, 2018

(65) Prior Publication Data
US 2019/0189087 A1   Jun. 20, 2019

(30) Foreign Application Priority Data

Aug. 31, 2016 (DE) ......................... 10 2016 216 415

(51) Int. Cl.
*G08B 21/00* (2006.01)
*G09G 5/37* (2006.01)
(Continued)

(52) U.S. Cl.
CPC ............... *G09G 5/37* (2013.01); *B60K 35/00* (2013.01); *G06K 9/00805* (2013.01);
(Continued)

(58) Field of Classification Search
CPC ...... B60K 2370/1529; B60K 2370/178; B60K 2370/179; B60K 2370/191;
(Continued)

(56) References Cited

U.S. PATENT DOCUMENTS

| 5,698,906 A | 12/1997 | Gardner et al. |
| 2008/0224840 A1 | 9/2008 | Kawachi |

(Continued)

FOREIGN PATENT DOCUMENTS

| CN | 101528497 | 9/2009 |
| CN | 201566499 | 9/2010 |

(Continued)

OTHER PUBLICATIONS

Chinese Office Action dated Aug. 5, 2019 from Chinese Patent Application No. 201780052984.X, with English translation of summary of Examiner's comments, 7 pages.

(Continued)

*Primary Examiner* — Mark S Rushing
(74) *Attorney, Agent, or Firm* — Staas & Halsey LLP

(57) ABSTRACT

A display apparatus for a motor vehicle includes a display surface. A piece of information is displayed on the display surface. In order to offer an optimum display and detectability of the information in different situations, the display surface is arranged on a movably mounted closure device of the motor vehicle and a display of the information is controlled subject to a degree of opening of the closure device detected by using a position sensor of the motor vehicle.

20 Claims, 5 Drawing Sheets

(51) Int. Cl.
*B60K 35/00* (2006.01)
*G06K 9/00* (2006.01)
*B60Q 9/00* (2006.01)

(52) U.S. Cl.
CPC . *B60K 2370/119* (2019.05); *B60K 2370/1529* (2019.05); *B60K 2370/178* (2019.05); *B60K 2370/179* (2019.05); *B60K 2370/182* (2019.05); *B60K 2370/186* (2019.05); *B60K 2370/191* (2019.05); *B60K 2370/195* (2019.05); *B60K 2370/21* (2019.05); *B60K 2370/334* (2019.05); *B60K 2370/67* (2019.05); *B60K 2370/77* (2019.05); *B60Q 9/00* (2013.01); *G09G 2354/00* (2013.01); *G09G 2380/10* (2013.01)

(58) Field of Classification Search
CPC .......... B60K 2370/195; B60K 2370/21; B60K 2370/334; B60K 2370/67; B60K 2370/77; B60K 35/00; B60Q 9/00; G06K 9/00805; G09G 2354/00; G09G 2380/10; G09G 5/37
See application file for complete search history.

(56) References Cited

U.S. PATENT DOCUMENTS

| | | | |
|---|---|---|---|
| 2011/0175798 A1* | 7/2011 | Sato | B60K 35/00 345/7 |
| 2014/0098230 A1* | 4/2014 | Baur | B60R 16/0232 348/148 |
| 2014/0309864 A1* | 10/2014 | Ricci | A61B 5/0077 701/36 |
| 2017/0098364 A1* | 4/2017 | Jaegal | G06K 9/00832 |

FOREIGN PATENT DOCUMENTS

| | | |
|---|---|---|
| CN | 103770649 | 5/2014 |
| DE | 10 2005 017 556 A1 | 10/2006 |
| DE | 10 2006 050 016 A1 | 4/2008 |
| DE | 10 2007 046 971 A1 | 4/2009 |
| DE | 10 2007 061 723 A1 | 6/2009 |
| DE | 10 2014 205 953 A1 | 10/2015 |
| DE | 10 2014 214 585 A1 | 1/2016 |
| EP | 1 637 386 A1 | 3/2006 |
| JP | 2002-370560 | 12/2002 |
| JP | 2010-6092 | 1/2010 |
| JP | 2011-75344 | 4/2011 |
| JP | 2011-213186 | 10/2011 |
| JP | 5692913 | 2/2015 |
| JP | 5757410 | 6/2015 |

OTHER PUBLICATIONS

International Search Report dated Oct. 17, 2017 from International Patent Application No. PCT/EP2017/069624, 4 pages.
German Office Action dated Mar. 30, 2019 from German Patent Application No. 10 2016 216 415.5, 8 pages.
International Preliminary Report on Patentability dated Aug. 6, 2018 from Patent International Patent Application No. PCT/EP2017/069624, 5 pages.

* cited by examiner

METHOD FOR CONTROLLING A DISPLAY APPARATUS FOR A MOTOR VEHICLE, AND MOTOR VEHICLE HAVING A DISPLAY APPARATUS

CROSS REFERENCE TO RELATED APPLICATIONS

This application is a U.S. national stage of International Application No. PCT/EP2017/069624, filed on Aug. 3, 2017. The International Application claims the priority benefit of German Application No. 10 2016 216 415.5 filed on Aug. 31, 2016. Both the International Application and the German Application are incorporated by reference herein in their entirety.

BACKGROUND

Described herein is a method for controlling a display apparatus for a motor vehicle, and to a motor vehicle having a display apparatus.

Today, a wide variety of types of display apparatuses and display panels for motor vehicles are known from vehicle construction. German Patent Application No. DE 10 2006 050 016 A1 describes a motor vehicle having a sensor arrangement for determining a line of sight of a driver of the motor vehicle and having two display apparatuses. The line of sight of the driver is taken as a basis in this case for controlling a display of information relating to the motor vehicle on the first display apparatus or on the second display apparatus, with for example a window of the motor vehicle being able to be used to display the information. The aim is generally to improve operation of the motor vehicle.

German Patent Application No. DE 10 2007 046 971 A1 describes a motor vehicle having a display and a camera, wherein the camera can be used to record a surroundings image of part of the surroundings of the motor vehicle that is behind the motor vehicle, which part of the surroundings is presentable completely or in part by use of the display. In this case, the display is arranged inside the motor vehicle such that the recorded surroundings image is presentable to a driver of the motor vehicle behind a side window of the motor vehicle as a virtual image. There can also be provision for a second display, which is perceptible to the motorist directly as a real image, as part of a dual view display. Overall, the aim is to achieve as identical a form of presentation to a rear-view mirror as possible without the rear-view mirror.

German Patent Application No. DE 10 2007 061 723 A1 describes a method for displaying warnings in a motor vehicle and a corresponding display arrangement. In this case, objects are first of all detected in vehicle surroundings and then at least one visual display unit is activated when an object has been detected in the vehicle surroundings. The visual display unit in this case has multiple display states representing a different potential for collision. Besides the objects themselves, it is for example also possible to detect a distance of the object from the vehicle, a relative speed or a relative direction of movement of the object. For example different brightnesses, color symbols or a bar display can be used for the display. The display elements can be for example integrated inside a trim for the A, B and/or C pillar of the vehicle or can be arranged on these pillars, but also on the vehicle roof lining, for example. In order to inform the driver about important events, warnings or advice only when required, there is provision for the display elements to be switched off when an object is not detected.

SUMMARY

It is an aspect of the disclosure to provide a method for controlling a display apparatus for a motor vehicle and a motor vehicle having such a display apparatus that provide optimum presentation and discernibility of information in different situations.

The method described herein for controlling a display apparatus for a motor vehicle, which display apparatus includes a display panel, involves information being presented on the display panel. The motor vehicle in this case has a passenger compartment delimited from surroundings of the motor vehicle by an outer shell, wherein the outer shell has an opening to the surroundings and the opening is closable by use of a movable closure device. The opening is thus a passage opening for example in a side wall or else a roof of the motor vehicle, and the closure device can be moved in order to open or close, cover or conceal the opening entirely or in part. The closure device can be for example a pivotable door, a sliding door, a gull-wing door, a tailgate or, in the case of a roof opening, a sliding or folding roof, or the like. Accordingly, the closure device can be for example swivellable, or pivotable, slidable or retractable or movable in a similar manner. The display panel is arranged on this movable closure device.

In order to provide optimum presentation and discernibility of the present information, there is provision described herein for the presentation of the information to be controlled on the basis of a degree of opening of the closure device that is detected by use of a position sensor of the motor vehicle. The reason is that when the closure device is moved, that is to say when it is completely or partially opened or closed, the display panel is moved together with the closure device relative to the rest of the motor vehicle—for example relative to the passenger compartment or an interior of the motor vehicle. Thus, as a rule, a line of sight or an angle from or at which the display panel is viewed or seen by a vehicle occupant also changes. The degree of opening of the closure device can exist or be measured for example between a closed position of the closure device and a present, instantaneous position of the closure device and/or between this instantaneous position and a frame part of the motor vehicle. The degree of opening can describe a particular position of the closure device and can be understood to mean for example a door opening angle, a slide position of a sliding door or of a sunroof, or the like.

Control of the presentation can involve the respective present degree of opening, which can also continuously change when the closure device moves, being taken into consideration in order to ensure optimum adaptation of the presentation and hence a differently set display of the information in each case for any position or attitude of the closure device. This can involve, by way of example, a reference point arranged or located in particular in the interior of the motor vehicle being taken into consideration. This reference point can correspond to a typical position of a head of a vehicle occupant, for example, and be defined relative to a nonpivotable assembly of the motor vehicle, such as the frame, for example. By taking into consideration the degree of opening of the closure device when the information is presented, the information advantageously remains discernible or readable by the vehicle occupant at any time regardless of the respective present degree of opening of the closure device. As a result, it is also possible—depending on the type of presented information—for convenience of operation or use of the display apparatus, but also safety when handling or using the motor vehicle, for example, to be improved.

The display panel used can be a window pane of the closure device, that is to say for example a side window or a glass element of a sunroof of the motor vehicle, which to this end are able to have their entire surface or a subregion configured or set up as a screen or projection panel. As an example, a transparent, active screen, for example based on an OLED ("organic light emitting diode") technology, is arranged or provided for on or in the window pane.

The display panel can for example also be arranged on or in another region of the closure device, however, and for example integrated in an interior trim, and it is likewise conceivable for multiple adjacent or spaced-apart display panels to be provided for or arranged on the closure device.

Within the context of the disclosure, the terms information and presentation of the information are intended to be interpreted and understood broadly. As such, information can be used for teaching the vehicle occupant(s) about particular facts and/or also for entertaining the vehicle occupant(s), for example. At least almost any means and elements can be used for the presentation in this case. By way of example, use of any combinations of symbols, graphical elements, structural elements, texts, moving images and the like is conceivable. In principle, presentation of, in particular two-dimensional, geometric shapes is also conceivable, for example, which darken an applicable subregion of the display panel, in particular of the window pane. As a result, it is possible for a particular region of surroundings of the motor vehicle to be concealed from the point of view or perspective of the vehicle occupant(s), and/or a particular visual effect or impression—also but not necessarily taking into consideration the surroundings—can be given.

In a further configuration of the method described herein, there is provision for the degree of opening of the closure device to be taken as a basis for controlling a geometry of the presentation of the information. In other words, it is thus possible for the same information to be presented using, at least in principle, the same or at least using similar means and elements that merely have had or have their geometry adapted or altered. The term geometry can be understood to mean, and can include, various factors and parameters in this case, such as for example a size, shape, a rotation and/or tilt angle or the like. Since the pivoting of the closure device relative to the rest of the vehicle and/or relative to the vehicle occupant is primarily a spatial or geometric alteration, this, that is to say the applicable control of the geometry of the presentation, allows the respective situation to be reacted to in optimum fashion. Therefore, the control or adaptation of the geometry of the presentation thus allows for example equalization of or compensation for the change in the appearance or in the perception of the information or in the presentation of the information from the point of view or perspective of the vehicle occupant(s) that is brought about or caused by the swivel movement or the degree of opening of the closure device.

In a further configuration of the method described herein, there is provision for a perspective distortion of the presentation of the information to compensate for the degree of opening to be controlled relative to a predetermined viewing direction and/or a predetermined viewing location on the basis of the degree of opening. The predetermined viewing location determined or defined can be for example a typical head position of a vehicle occupant, from which an imaginary straight connection to the display panel can stipulate the predetermined viewing direction. Specific control of the perspective distortion of the presentation can advantageously compensate for or equalize the substantial effect of the change in the appearance or the perception or the perceptibility of the presentation of the information as a result of the pivoting of the closure device. This can advantageously ensure that the presentation of the information has the same appearance for the respective vehicle occupant regardless of the degree of opening or of a movement of the closure device. This furthermore allows particularly fast, convenient and simple and also safe perceptibility and discernibility of the information by the vehicle occupant.

During adaptation of the geometry and/or of the perspective distortion of the presentation, the latter can also be rotated or twisted.

In a further configuration of the method described herein, there is provision for the degree of opening to be taken as a basis for controlling a content of the presented information. In other words, it is thus not just the case that the same information is displayed in an adapted form or shape or geometry, but rather information whose content is also different and/or that has a different meaning is presented. This can be completely different information or else an addition to or adaptation of presented information that already exists. As a result, it is particularly advantageously possible for information that is relevant only in the respective situation to be specifically displayed, so that the respective information is not unnecessarily presented at other times or for a different degree of opening. This situation-adapted selection of the presented information, or information to be presented, advantageously allows a respective vehicle occupant's attentiveness to be better drawn to the information presented in a manner relevant to the situation.

In a further configuration of the method described herein, there is provision for a sensor device to be used to detect a line of sight of a vehicle occupant and to control the presentation of the information to compensate for the degree of opening of the closure device on the basis of the detected line of sight. In other words, both the degree of opening of the closure device and the line of sight of the vehicle occupant and if need be a position of the vehicle occupant are thus evaluated and taken into consideration for the presentation of the information. This is particularly advantageous because pivoting, that is to say for example opening or closing the closure device, is often also accompanied by a movement or change of position of the vehicle occupant. Therefore, additionally taking into consideration the line of sight of the vehicle occupant allows an actual viewing angle to be ascertained for the information presented or to be presented. This in turn allows improved control or adaptation of the presentation to suit the respective situation.

In a further configuration of the method described herein, there is provision for at least part of surroundings of the motor vehicle to be captured by use of a surroundings capture apparatus of the motor vehicle and at least part of the captured surroundings to be presented on the display panel. In other words, the surroundings capture apparatus and the display apparatus can thus provide or perform a functionality that is to date typically carried out or provided by a rear-view and/or side-view mirror of the motor vehicle. The display panel can thus act as a virtual rear-view and/or side-view mirror and this is particularly advantageous in this case, since movement, in particular pivoting of the closure device, can result in particularly dangerous situations and interactions with the surroundings of the motor vehicle and objects and people therein arising. Furthermore, typical arrangements customary today can involve a side-view mirror arranged on the closure device not or not fully carrying out its actual function or task for the vehicle occupant, in particular when opening but generally also when the closure device is arranged outside its closed position. The presentation of at least part of the captured surroundings on the display panel thus allows safety during operation of the motor vehicle to be advantageously increased.

In a further configuration of the method described herein, there is provision for at least part of surroundings of the motor vehicle to be captured by use of a surroundings capture apparatus of the motor vehicle, data captured by the surroundings capture apparatus to be evaluated for a risk of collision, and if a risk of collision is detected then a warning to be presented on the display panel when the closure device is opened. Such a warning can be presented in the shape of a symbol, a graphic and/or a text or word, for example. The risk of collision can be ascertained or detected or defined for example on the basis of or taking into consideration a detected relative movement between the motor vehicle and an object or a person in the captured surroundings of the motor vehicle and/or a position of the object or the person and/or a projected direction of movement or trajectory of the object or the person. Particularly advantageously, the warning can be presented such that it can be perceived both by the respective vehicle occupant(s) and by a detected person in the surroundings of the motor vehicle and/or further people. To this end, for example a brightness of the presentation of the warning can be adapted and for example adjusted to a maximum value. It is likewise conceivable for the warning to be presented not continuously but rather at intervals or in flashing fashion, which can improve its perceptibility. It is also conceivable for a detected risk of collision to be classified on a relative scale or rated on the basis of a relative scale and for the presentation of the warning to be adapted—for example in terms of its brightness, its size or for example its flash rate—on the basis of the respective classification or rating. The use of the display panel arranged on the closure device for presenting such a warning is particularly advantageous because the door and hence also the display panel—in particular in the case of potentially particularly dangerous opening of the closure device—are in a typical field of view or in a typical line of sight of the respective vehicle occupant.

In a further configuration of the method described herein, there is provision for the display panel to be adjustable between at least one use position and a nonuse position. The display panel is then automatically adjusted from the nonuse position to the use position when opening the closure device to present the information, provided that the display panel is in a nonuse position at the beginning of the applicable opening movement.

The use position is distinguished in that at least part of the display panel is directly visible to the vehicle occupant. In other words, the information presented on the display panel is thus visible directly and without hindrance from the vehicle interior or from a passenger compartment of the motor vehicle in the use position. In this case, it is entirely possible for there to be provision for multiple use positions for the display panel, these being able to differ in a proportion or a size of a visible surface region of the display panel, for example. In the nonuse position, on the other hand, the display panel is not visible. In the nonuse position, the display panel can be e.g. concealed and/or retracted in a shaft.

The independent or automatic adjustment of the display panel can advantageously ensure that the information can be presented or displayed to the vehicle occupant without further operator control actions by the vehicle occupant when opening the closure device. This can advantageously increase safety, since in this way it is possible for warnings or particularly situation-relevant advice, for example, to be reliably presented. It is conceivable that, depending on the information to be presented, the display panel is adjusted into a particular one of multiple available use positions, so that it is ensured that the information to be presented is presentable and visible at least in a predetermined minimum size. For example, it is in this instance possible for the information to be presented wholly or in part or in one of multiple levels of detail or variants already during an adjusting movement of the display panel. As a size of the visible subregion of the display panel increases with the adjustment of the display panel, the presentation of the information can be adapted on the basis of this size of the respective available visible subregion. The effect achieved by this is that the information is presented and visible as early or as quickly as possible after the beginning of the opening of the closure device. At the same time, a respective optimum presentation of the information is advantageously achieved in dynamic fashion.

A motor vehicle described herein has a display apparatus that includes a display panel and is set up for presenting information on this display panel. The motor vehicle in this instance has a passenger compartment delimited from surroundings of the motor vehicle by an outer shell, wherein the outer shell has an opening to the surroundings and the opening is closable by use of a movable closure device. The display panel is arranged on the movable closure device of the motor vehicle. In order to afford optimum presentation and discernibility of the information that is presented or to be presented, the disclosure has provision for the motor vehicle to include a position sensor for detecting a degree of opening of the closure device, and for the display apparatus to be set up to control the presentation of the information on the basis of the detected degree of opening.

The configurations of the method described herein and of the motor vehicle described herein that are specified and described above and below, and the respective corresponding advantages, are reciprocally transferrable, mutatis mutandis, as appropriate, between the method and the motor vehicle and also devices and assemblies used for performing the method.

BRIEF DESCRIPTION OF THE DRAWINGS

These and other features and advantages will emerge and become more readily appreciated from the description of various examples below, taken in conjunction with the accompany drawings, of which.

DETAILED DESCRIPTION

Figure 1:
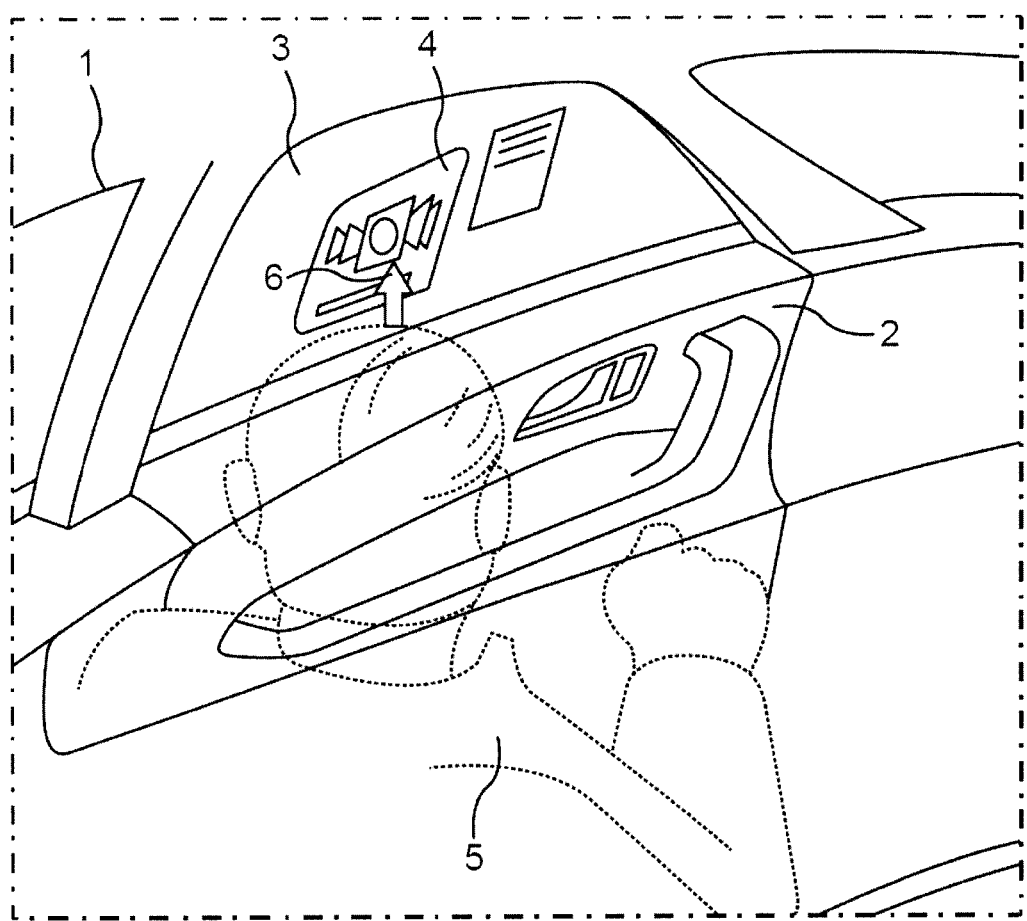
FIG. 1 is a schematic and partial perspective view of an interior of a motor vehicle having a door, the window pane of which is configured as a display panel.

Reference will now be made in detail to examples which are illustrated in the accompanying drawings, wherein like reference numerals refer to like elements throughout.

FIG. 1 uses a schematic and partial perspective depiction to show a passenger compartment or interior of a motor vehicle 1. A lateral wall of the motor vehicle 1 has an opening, which in the example is a door opening. This door opening is closable by a movable closure element, which in the example is in the form of a door 2 and which has a window pane 3. The door 2 is mounted swivellably in this case, that is to say that it is openable and closable. The inherently transparent window pane 3 is in the form of a display panel of a display apparatus of the motor vehicle 1 in the example and, to this end, has a transparent screen (display), for example. This screen can also be approach-and/or touch-sensitive, that is to say operable by touch (touchscreen). In the example, a presentation 4 of information on the window pane 3 is displayed here. The information can be compiled from multiple information elements and, by way of example, be a combination of symbols, graphical elements and text. Furthermore, a vehicle occupant 5 is depicted, who in this case is in the interior or passenger compartment of the motor vehicle 1 and beside the door 2. A line of sight of the vehicle occupant 5 in the direction of the window pane 3 and the presentation 4 is indicated by an arrow 6.

Many diverse variants of display panels arranged on or in a motor vehicle 1 are already known from vehicle construction. Such known display panels are typically installed or arranged at a fixed location or immovably, however, whereas in the example the door 2 and hence also the window pane 3 and the presentation 4 are movable as a result of the pivotability of the door 2. When the door 2 is moved or pivoted, the perspective from which the vehicle occupant 5 sees the presentation 4 thus changes.

For this reason, there is provision in the example for the presentation 4 to be controlled on the basis of a swivel angle of the door 2 that is detected by use of a position sensor—in this case a door angle sensor—of the motor vehicle 1. Additionally, there is provision in the example for the motor vehicle 1 to have a sensor device by use of which the line of sight 6 of the vehicle occupant 5 is detected. This detected line of sight 6 is then also processed or taken into consideration as well for the control of the presentation 4. This sensor device can include for example a camera or a plurality of cameras that are arranged inside the motor vehicle 1 and directly or indirectly connected to an electronic evaluation device. This evaluation device can evaluate data recorded by use of the camera or cameras in order to detect and/or track the line of sight 6 of the vehicle occupant 5 (eye tracking).

The motor vehicle 1 can be for example a vehicle that is piloted or that drives, or is operable, in entirely or partially autonomous or highly automated fashion. In this case, in particular the additional detection and consideration of the line of sight 6 can be particularly advantageous, since the respective vehicle occupants do not necessarily adopt known or fixed positions inside such a vehicle.

The presentation 4 has its geometry adapted in this case on the basis of the respective present swivel angle of the door 2, in particular by virtue of a perspective distortion adapted of the presentation 4 being adapted or adjusted in order to effectively achieve, from the perspective or view of the vehicle occupant 5, a form of the presentation 4 that is as discernible and undistorted as possible. The adaptation or alteration of the geometry and of the perspective distortion can be effected or defined for example in comparison with or relative to a form of presentation of the information that would appear undistorted to an observer whose line of sight is a surface normal of the window pane 3, which is thus directed perpendicularly to the display panel. As is easily discernible in the example, the line of sight 6 of the vehicle occupant 5 is by contrast directed not perpendicularly but rather at an acute angle to the window pane 3 and the presentation 4.

This angle between the viewing direction or line of sight 6 of the vehicle occupant 5 and the window pane 3 also changes when the door 2 pivots.

Figure 2:
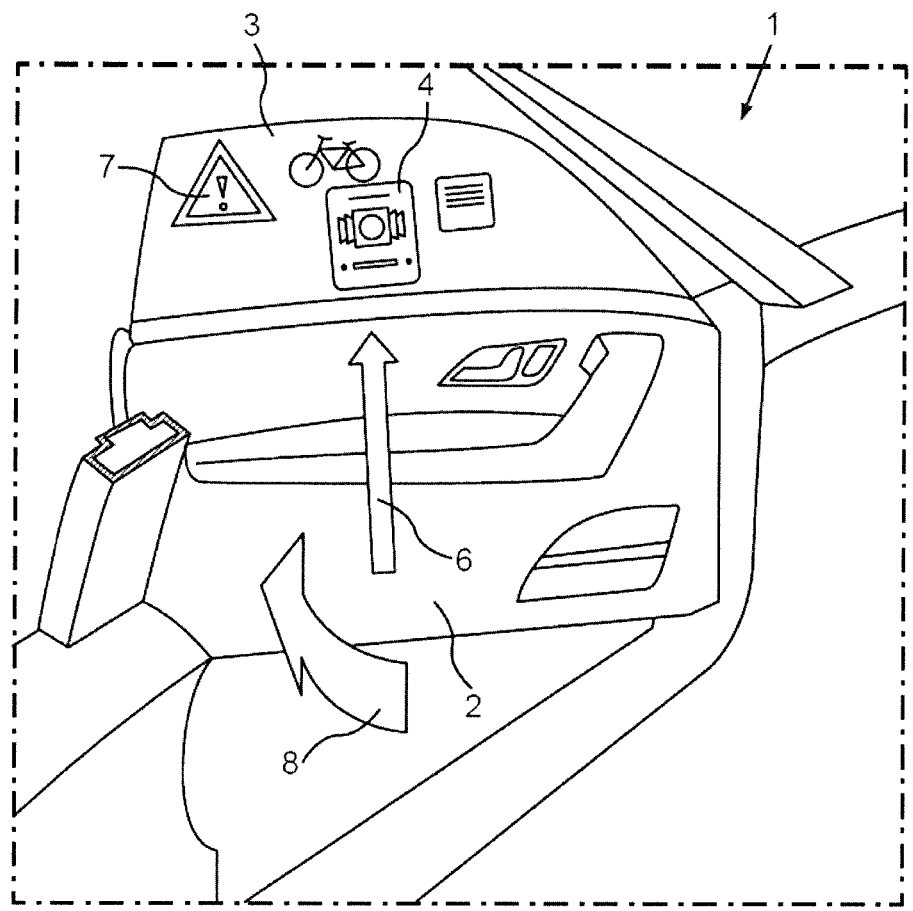
FIG. 2 is a schematic and partial perspective view of an open door of a motor vehicle.

FIG. 2 uses a schematic partial perspective depiction to show the door 2 of the motor vehicle 1 in an open position, which is pivoted in comparison with its closed position depicted in FIG. 1. The applicable pivot movement, that is to say the applicable opening of the door 2, is indicated by an arrow 8 in this case. From the point of view of the vehicle occupant 5, who is not depicted in this case, the viewing angle between the line of sight 6 and the window pane 3 and hence also the presentation 4 has now changed in comparison with the situation depicted in FIG. 1. The control of the presentation 4, which takes into consideration the swivel angle of the door 2, compensates for the swivel angle, and hence the change in the viewing angle that is brought about by the pivoting of the door 2. As a result, the presentation 4 is thus shown to the vehicle occupant 5 in undistorted form or shape every time from his point of view of perspective, regardless of the swivel angle of the door 2. This means that the presentation is discernible as optimal and in, as it were, a natural form or shape.

Figure 3:
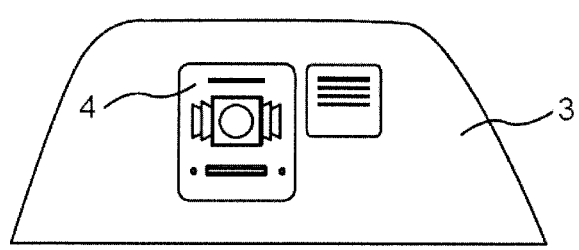
FIG. 3 is a schematic depiction of a window pane of a motor vehicle door with information presented in undistorted fashion.

An undistorted reference form or shape of the presentation 4 on the window pane 3 is shown in a schematic view in FIG. 3.

In the example, there is furthermore provision for the motor vehicle 1 to have a surroundings capture apparatus by use of which at least part of surroundings of the motor vehicle can be captured or sensed. The surroundings capture apparatus can to this end include a camera or a plurality of cameras and/or further sensors, for example. Data delivered by the surroundings capture apparatus are evaluated by a controller of the motor vehicle 1, in particular in respect of object and/or person detection and a risk of collision between a detected object or a detected person and the motor vehicle 1. In particular, pedestrians, cyclists and other vehicles can be detected. When the door 2 is opened and a risk of collision has been or is detected, an applicable warning 7 is presented on the display panel of the window pane 3. The warning 7 can be provided in addition to the presentation 4 of the information, can alter the presentation 4 or can replace the presentation 4. As part of the warning 7, it is possible for a danger or advice symbol and/or an image or a representation of the detected object or of the detected person to be presented, for example. The presentation 4 is thus controlled in regard to or in respect of its content.

Figure 4:
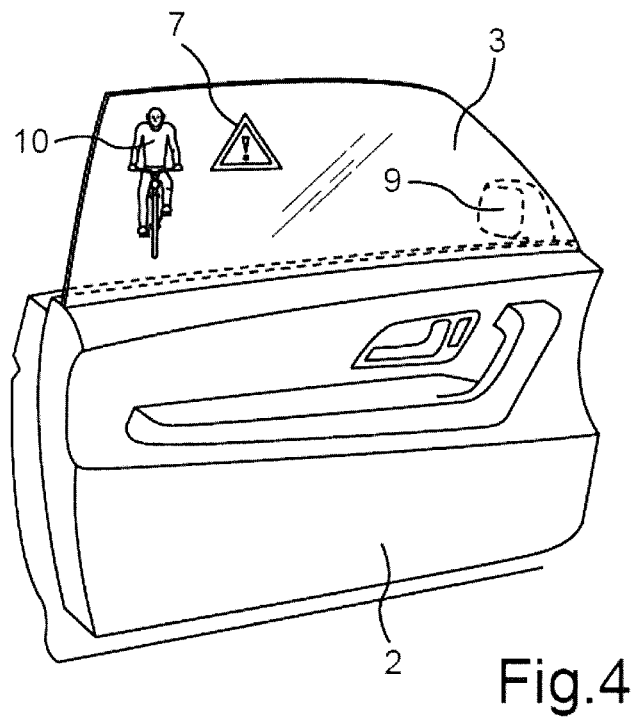
FIG. 4 is a schematic perspective depiction of a motor vehicle door having a side-view mirror and a warning presented on the window pane configured as a display panel.

FIG. 4 shows a schematic perspective depiction of the door 2, which in the example includes an exterior or side-view mirror 9. From the point of view of a vehicle occupant 5, although a subregion of the surroundings of the motor vehicle 1 that is of particular relevance to a risk of collision can be observed by use of the side-view mirror 9 when the door 2 is in a closed position, this is not the case when opening the door 2 or when the door 2 is in an open position.

The term or wording "when opening" is not restricted to movements of the door 2 from its closed position or into a maximum swivel angle in this case within the context of the disclosure. The same applies to the term "when closing" the door 2 and alternative corresponding wordings.

Since, in particular when opening the door 2, the surroundings of the motor vehicle 1 and a possible risk of collision are thus not reliably discernible by the vehicle occupant 5 by use of the side-view mirror 9, there is provision in the example for at least part of the surroundings of the motor vehicle 1 captured by the surroundings capture apparatus to be presented on the window pane 3. This thus supports or replaces the function of the side-view mirror 9 by virtue of the surroundings capture apparatus and the display panel acting like a virtual rear-view or side-view mirror 9.

The display of the warning 7 and/or of a surroundings presentation 10 can in this case likewise be controlled on the basis of the swivel angle of the door 2. By way of example, the warning 7 and/or the surroundings presentation 10 can be, or can have been, activated only when opening the door 2 and/or when the door 2 is in an open position.

Since the window pane 3 of the door 2 is used as a display panel in the example, it can be problematic if information, in particular the warning 7, is meant to be displayed or presented while the window pane 3 is in a nonuse position. In the nonuse position of the window pane 3 or of the display panel, the window pane 3 can be retracted in the door 2, for example, and therefore not visible to the vehicle occupant 5. In the example, there is therefore provision for a state or a position of the window pane 3 to be detected and/or monitored by an applicable sensor system of the motor vehicle 1. When opening the door 2, the window pane 3 is then independently or automatically adjusted from the nonuse position into a use position, in which at least a subregion of the display panel is visible to the vehicle occupant 5.

Figure 5:
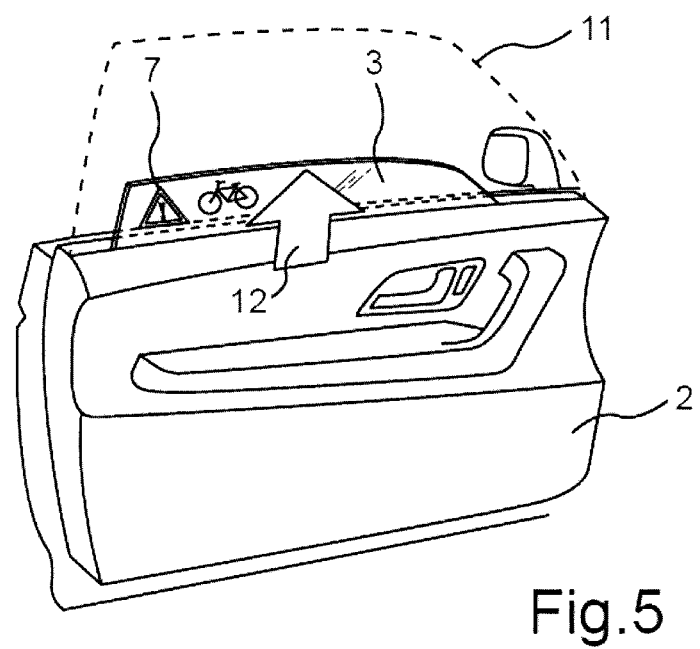
FIG. 5 is a schematic perspective depiction of a motor vehicle door having a window pane configured as a display panel and partially retracted in the motor vehicle door.

FIG. 5 shows a schematic perspective depiction of the door 2 in this regard, wherein the window pane 3 is partially retracted in the door 2, so that at least a subregion of the display panel is concealed and not visible to the vehicle occupant 5. The automatic adjustment of the window pane 3 from the nonuse position is indicated by an arrow 12 in this case. A contour 11 likewise indicates a use position of the window pane 3, in which the whole display panel is unconcealed and visible to the vehicle occupant 5. However, there is not necessarily provision for the window pane 3 to be automatically adjusted completely as far as this position or attitude indicated by the contour 11.

Advantageously, the information, in particular the warning 7, is displayed when automatically adjusting the window pane 3 when opening the door 2 as soon as an area or size of the display panel that is sufficient for a discernible presentation is available, that is to say is visible to the vehicle occupant 5. For this purpose, a particular minimum position of the window pane 3 or a minimum size of a visible or easily seen subregion of the display panel can be defined or prescribed, for example. As an example, the warning 7, the information and/or the presentation 4 is dynamically adapted to suit the respective available size of the visible or easily seen region of the display panel.

Figure 6:
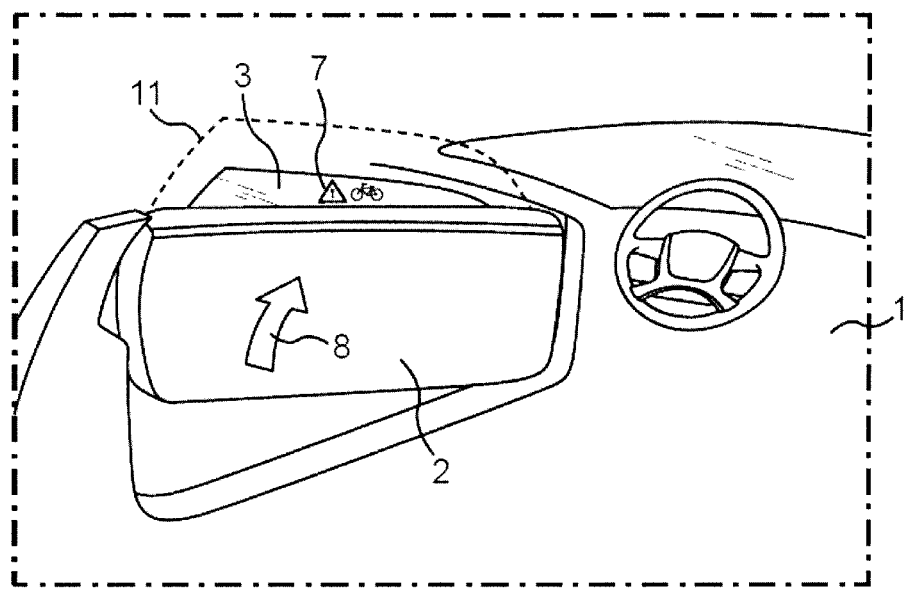
FIG. 6 is a schematic perspective view of part of a motor vehicle having a scissor door.

FIG. 6 shows a schematic perspective view of part of a motor vehicle 1, the door 2 of which is in the form of a scissor door. In this case, it is for example also possible to take into consideration a limitation on the visibility of the presentation 4 or the warning 7 as a result of concealment by a front window or windshield or a body part, for example an A pillar, for adaptation of the display. Similarly, a gull-wing door or any other design, arrangement and/or mounting of the door 2 would also be conceivable, for example. Otherwise, the statements made in regard to the rest of the embodiments apply mutatis mutandis.

Figure 7:
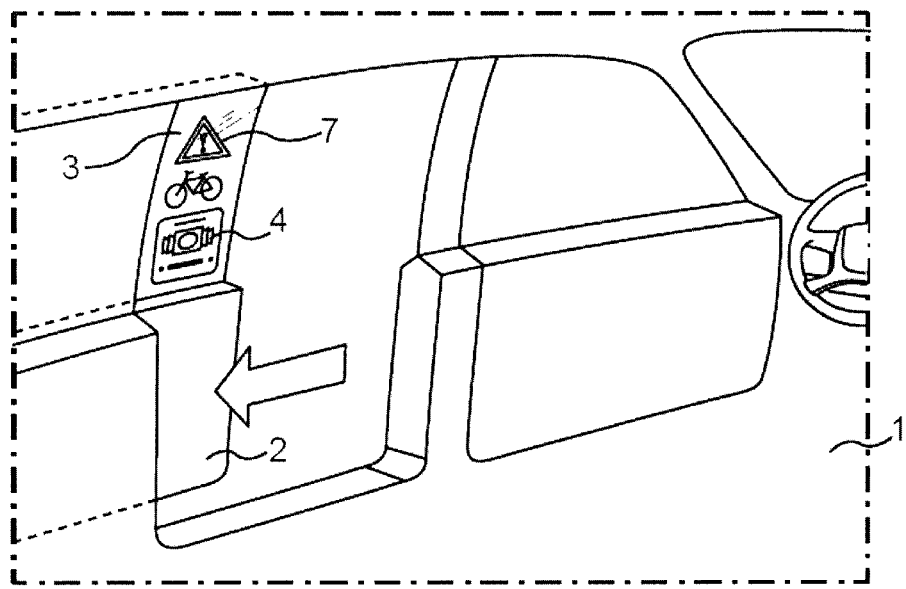
FIG. 7 is a partial and schematic perspective view of a motor vehicle having a sliding door.

FIG. 7 shows a partial and schematic perspective view of a lateral wall of a motor vehicle 1 for which the door 2 is in the form of a sliding door. In this case too, the statements and explanations provided in regard to the rest of the embodiments apply accordingly.

Figure 8:
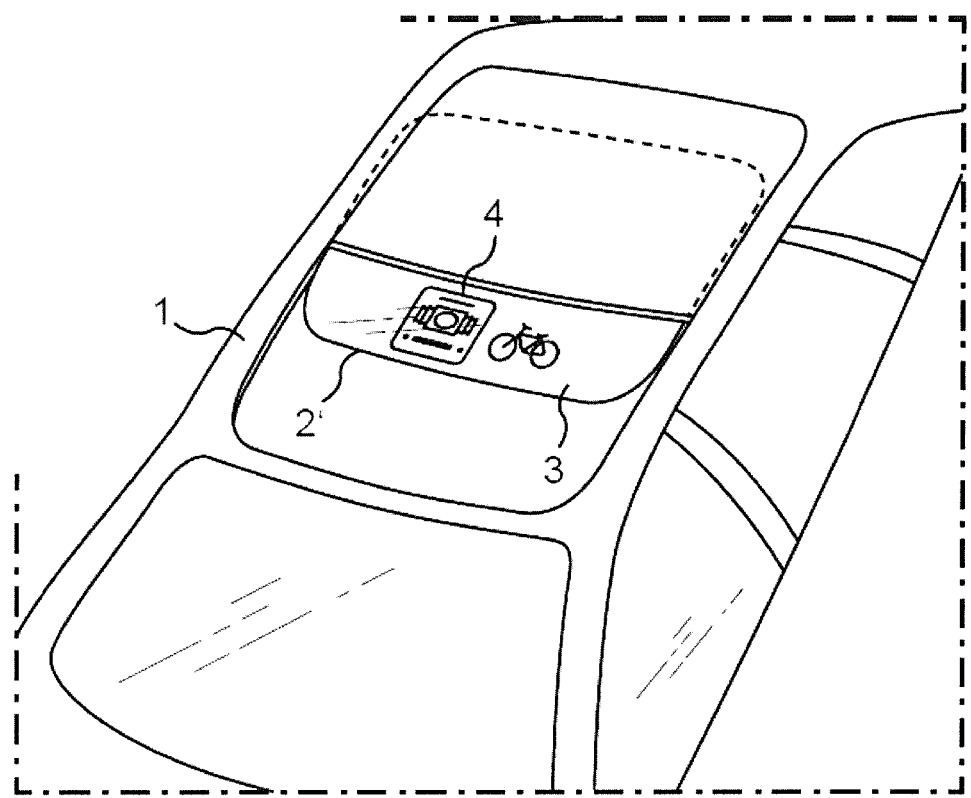
FIG. 8 is a partial and schematic perspective view of a roof of a motor vehicle that has a roof opening or a roof window with a sunroof.

FIG. 8 shows a partial and schematic perspective view of a roof of a motor vehicle 1 that has a roof opening or a roof window or a rooflight. The roof opening is closable by use of a closure element, which in this case is in the form of a sunroof 2' and can have a pane of glass or the window pane 3 over the full area or part of the area. The sunroof 2' can be moved forward and back in the vehicle longitudinal direction. The details concerning the rest of the embodiments can also be transferred to the sunroof 2' mutatis mutandis. Additionally or alternatively, a design as a tilting or folding roof or mounting is also conceivable that allows tilting of the sunroof 2' or arrangement at an angle.

Furthermore, independently of a specifically chosen embodiment, there can in principle also be provision for further adaptations for the control of the presentation 4. By way of example, adaptation of a brightness and/or a color and/or a contour boldness or the like is conceivable. It is also conceivable for such adaptations to be performed or focused uniformly over the whole area of the presentation 4. Alternatively, focusing or control, in particular taking into consideration the swivel angle of the door 2—or generally the degree of opening of the closure device—and/or the line of sight 6 of the vehicle occupant 5, that is to say a viewing perspective, can also be possible variably, in regions or for example in or with a continuous profile or with a gradient.

A description has been provided with reference to examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for controlling a display apparatus for a motor vehicle having a passenger compartment delimited from surroundings of the motor vehicle by an outer shell, the outer shell having an opening to the surroundings and the opening being closable by using a movable closure device movable between a fully closed position and a fully open position, the method comprising:
    presenting information on a display panel of the display apparatus, the display panel being arranged on the movable closure device;
    detecting a first degree of opening of the movable closure device at a first position between the fully closed position and the fully open position, by using a position sensor of the motor vehicle, the detected first degree of opening of the movable closure device at the first position being different from a detected degree of opening of the movable closure device at the fully closed position and a detected degree of opening of the movable closure device at the fully open position; and controlling at least one of a geometry and a content of the presented information such that information presented on the display panel is displayed in a first manner when the movable closure device is at the first position and the first degree of opening of the movable closure device at the first position is detected, and controlling at least one of the geometry and the content of the presented information such that information presented on the display panel is displayed in a second manner, different from the first manner, when the movable closure device is at the fully open position and the degree of opening of the movable closure device at the fully open position is detected.

2. The method as claimed in claim 1, further comprising, based on the detected first degree of opening, controlling a perspective distortion of the presented information to compensate for the detected first degree of opening relative to at least one of a predetermined viewing direction of a vehicle occupant and a predetermined viewing location of the vehicle occupant.

3. The method as claimed in claim 1, further comprising:
detecting, by a sensor of the motor vehicle, a line of sight of a vehicle occupant; and
controlling a feature of the presented information to compensate for the detected first degree of opening of the movable closure device based on the detected line of sight.

4. The method as claimed in claim 1, further comprising:
capturing, by a camera of the motor vehicle, at least part of the surroundings of the motor vehicle; and
presenting, on the display panel, at least part of the captured surroundings.

5. The method as claimed in claim 1, further comprising:
capturing, by a camera of the motor vehicle, at least part of the surroundings of the motor vehicle;
evaluating data captured by the camera, based on the capturing of the at least part of the surroundings of the motor vehicle, for a risk of collision; and
presenting, on the display panel, a warning when a risk of collision is detected based on the evaluating of the data, when the movable closure device is opened.

6. The method as claimed in claim 1, wherein
the display panel is adjustable between at least one use position and a nonuse position, and
when the display panel is in the nonuse position and the movable closure device is subsequently opened, automatically adjusting the display panel from the nonuse position to the at least one use position during the opening of the movable closure device to present the information on the display panel.

7. A motor vehicle, comprising:
a passenger compartment delimited from surroundings of the motor vehicle by an outer shell, the outer shell having an opening to the surroundings;
a movable closure device to close the opening of the outer shell, movable between a fully closed position and a fully open position;
a position sensor to detect a first degree of opening of the movable closure device at a first position between the fully closed position and the fully open position, the detected first degree of opening of the movable closure device at the first position being different from a detected degree of opening of the movable closure device at the fully closed position and a detected degree of opening of the movable closure device at the fully open position; and a display apparatus including a display panel arranged on the movable closure device and configured to present information, the display apparatus being configured to control at least one of a geometry and a content of the information presented on the display panel such that the information presented on the display panel is displayed in a first manner when the movable closure device is at the first position and the first degree of opening of the movable closure device at the first position is detected, and to control at least one of the geometry and the content of the information presented on the display panel such that the information presented on the display panel is displayed in a second manner, different from the first manner, when the movable closure device is at the fully open position and the degree of opening of the movable closure device at the fully open position is detected.

8. The motor vehicle as claimed in claim 7, wherein the display apparatus is further configured to, based on the detected first degree of opening, control a perspective distortion of the information presented on the display panel to compensate for the detected first degree of opening relative to at least one of a predetermined viewing direction of a vehicle occupant and a predetermined viewing location of the vehicle occupant.

9. A motor vehicle, comprising:
a passenger compartment delimited from surroundings of the motor vehicle by an outer shell, the outer shell having an opening to the surroundings;
a movable closure device to close the opening of the outer shell;
a position sensor to detect a degree of opening of the movable closure device;
a camera to detect a line of sight of a vehicle occupant; and
a display apparatus including a display panel arranged on the movable closure device and configured to present information, the display apparatus being configured to control at least one of a geometry and a content of the information presented on the display panel based on the degree of opening detected by the position sensor and to control a feature of the information presented on the display panel to compensate for the degree of opening of the movable closure device based on the line of sight detected by the camera.

10. The motor vehicle as claimed in claim 7, further comprising:
a camera to capture at least part of the surroundings of the motor vehicle, and
the display apparatus is further configured to present at least part of the surroundings captured by the camera on the display panel.

11. The motor vehicle as claimed in claim 7, further comprising:
a camera to capture at least part of the surroundings of the motor vehicle when the movable closure device is opened or closed; and
a processor to determine whether a risk of collision exists based on data obtained from the at least part of the surroundings captured by the camera when the movable closure device is opened or closed, and the display apparatus is further configured to present, on the display panel, a warning when the risk of collision is determined to exist.

12. The motor vehicle as claimed in claim 7, wherein
the display panel is movable between at least one use position and a nonuse position, and
when the display panel is in the nonuse position and the movable closure device is subsequently moved, the display apparatus is configured to automatically move the display panel from the nonuse position to the at least one use position during the movement of the movable closure device and to present the information on the display panel.

13. The motor vehicle as claimed in claim 7, wherein
the movable closure device includes at least one of a door and a sunroof, and
the display panel is arranged on a window pane of the at least one of the door and the sunroof.

14. The motor vehicle as claimed in claim 13, wherein
the movable closure device includes the door,
the position sensor senses an angle of the door to detect the first degree of opening of the door, and
the display apparatus is configured to control the at least one of the geometry and the content of the information presented on the display panel based on the angle of the door sensed by the position sensor.

15. The motor vehicle as claimed in claim 14, wherein
the display apparatus is configured to control the at least one of the geometry and the content of the information presented on the display panel based on the angle of the door sensed by the position sensor so that the information presented on the display panel remains undistorted from a viewpoint of an occupant of the vehicle during movement of the door.

16. The motor vehicle as claimed in claim 13, wherein
the movable closure device includes the sunroof,
the position sensor senses at least one of an angle and sliding position of the sunroof to detect the first degree of opening of the sunroof, and
the display apparatus is configured to control the at least one of the geometry and the content of the information presented on the display panel based on the at least one of the angle and sliding position of the sunroof sensed by the position sensor.

17. The motor vehicle as claimed in claim 16, wherein
the display apparatus is configured to control the at least one of the geometry and the content of the information presented on the display panel based on the at least one of the angle and sliding position of the sunroof sensed by the position sensor so that the information presented on the display panel remains undistorted from a viewpoint of an occupant of the vehicle during movement of the sunroof.

18. The motor vehicle as claimed in claim 7, further comprising:
a camera to capture at least part of the surroundings of the motor vehicle; and
a processor to determine whether a risk of collision exists based on data obtained from the at least part of the surroundings captured by the camera,
wherein
the display panel is movable between at least one use position in which information presented on the display panel is visible and a nonuse position in which information presented on the display panel is not visible, and
when the display panel is in the nonuse position, the display apparatus is configured to automatically move the display panel from the nonuse position to the at least one use position if the processor determines the risk of collision exists and the movable closure device is moved.

19. The motor vehicle as claimed in claim 7, wherein
the display panel is adjustable between at least one use position and a nonuse position,
the nonuse position is a physical position in which the display panel is concealed, retracted or obstructed by another part of the motor vehicle,
the at least one use position is another physical position in which the display panel is at least partly visible to the vehicle occupant, and
when the display panel is in the nonuse position and the movable closure device is subsequently opened, the display panel is configured to be automatically adjusted from the nonuse position to the at least one use position during the opening of the movable closure device to present the information on the display panel.

20. A motor vehicle, comprising:
a passenger compartment delimited from surroundings of the motor vehicle by an outer shell, the outer shell having an opening to the surroundings;
a movable closure device to close the opening of the outer shell, movable between a fully closed position and a fully open position;
a position sensor is-configured to detect a first degree of opening of the movable closure device at a first position between the fully closed position and the fully open position, by determining an angle and/or distance between a location of the movable closure device at the fully closed position of the closure device and a location of the movable closure device at the first position and/or by determining an angle and/or distance between the location of the movable closure device at the first position and a location of a frame part of the motor vehicle, the detected first degree of opening of the movable closure device at the first position being different from a detected degree of opening of the movable closure device at the fully closed position and a detected degree of opening of the movable closure device at the fully open position; and
a display apparatus including a display panel arranged on the movable closure device and configured to present information, the display apparatus being configured to control at least one of a geometry and a content of the information presented on the display panel based on the detected first degree of opening at the first position.

* * * * *

UNITED STATES PATENT AND TRADEMARK OFFICE
CERTIFICATE OF CORRECTION

PATENT NO. : 10,726,812 B2
APPLICATION NO. : 16/328520
DATED : July 28, 2020
INVENTOR(S) : Jacques Hélot et al.

Page 1 of 1

It is certified that error appears in the above-identified patent and that said Letters Patent is hereby corrected as shown below:

In the Claims

Column 14, Line 37:
In Claim 20, after "sensor" delete "is-".

Signed and Sealed this
Eighth Day of September, 2020

Andrei Iancu
*Director of the United States Patent and Trademark Office*